United States Patent
Angle et al.

(10) Patent No.: US 7,729,997 B2
(45) Date of Patent: Jun. 1, 2010

(54) DETERMINATION OF AN ENTITY'S ASSETS ASSOCIATED WITH AN EVENT

(75) Inventors: J. Michael Angle, Norcross, GA (US); Ralph Whitlark, Birmingham, AL (US)

(73) Assignee: AT&T Intellectual Property I, L. P., Reno, NV (US)

( * ) Notice: Subject to any disclaimer, the term of this patent is extended or adjusted under 35 U.S.C. 154(b) by 768 days.

(21) Appl. No.: 11/252,011

(22) Filed: Oct. 17, 2005

(65) Prior Publication Data

US 2006/0282278 A1 Dec. 14, 2006

Related U.S. Application Data

(60) Provisional application No. 60/690,019, filed on Jun. 13, 2005.

(51) Int. Cl.
*G06Q 10/00* (2006.01)
(52) U.S. Cl. .................................................... 705/325
(58) Field of Classification Search ...................... 705/1
See application file for complete search history.

(56) References Cited

U.S. PATENT DOCUMENTS

| | | | |
|---|---|---|---|
| 2004/0186927 A1* | 9/2004 | Eryurek et al. | 710/12 |
| 2005/0034075 A1* | 2/2005 | Riegelman et al. | 715/714 |
| 2008/0140718 A1* | 6/2008 | Evans et al. | 707/104.1 |

OTHER PUBLICATIONS

SFW Launches Enhanced Safety and Emergency Preparedness Tool for Facilities; SFW Controller Sets New Facilties Management Industry Standard for Integrated Contol Over Security Infrastructure, . Mar. 28, 2005, PR Newswire US, pp. 1-3.*

* cited by examiner

*Primary Examiner*—Jamisue A Plucinski
(74) *Attorney, Agent, or Firm*—Scott P. Zimmerman PLLC

(57) ABSTRACT

Methods and systems expeditiously identify a company's or other entity's assets that are in some proximity of an incident or event, such as an emergency or other crisis situation. Buildings can be identified within a stated distance and direction from the location of an event. Additionally, an estimated number of employees and contract resources can be determined. A stand-alone computing device can be used to derive the information if AC power or network activity is lost. The stand-alone computing device provides a self-contained platform for determining assets of an entity.

20 Claims, 9 Drawing Sheets

Fig. 5

DETERMINATION OF AN ENTITY'S ASSETS ASSOCIATED WITH AN EVENT

RELATED APPLICATIONS

This application claims priority to U.S. Provisional Patent Application Ser. No. 60/690,019, filed on Jun. 13, 2005. The entire contents of the aforementioned provisional application are incorporated herein by reference.

BACKGROUND OF THE INVENTION

The world seems to be getting more and more dangerous. Humankind seems to be under constant threat. Mother nature provides her share of threats: hurricanes, tornados, earthquakes, tsunamis and other natural disasters. Regional conflicts and war also continue to threaten the well being of society. Furthermore, with the recent rise of terrorist attacks and threats, humankind must now be extra vigilant in protecting various assets and loved ones. The terrorist attacks that took place on Sep. 11, 2001, taught an invaluable lesson to the citizens of the United States and others around the globe. The devastation of the Twin Towers and resulting chaos, while terrible, provided an impetus to the American public not to be caught off guard again. In the midst of the chaos and afterward, businesses desperately attempted to locate vital assets. In many instances, it was difficult to track and to account for the assets in a timely manner, partly due to a lack of readily available identification, location, and other information associated with the assets.

SUMMARY OF THE INVENTION

Embodiments of the invention provide methods and a system configured to expeditiously identify an entity's assets, such as human and physical resources, that are in some proximity of an incident or event, such as emergency or other crisis situation. Embodiments of the invention operate to identify buildings within a stated distance and direction from the location of an event. Additionally, an estimated number of associated employees and contract resources can be determined. A stand-alone computing device can be used to derive the information if AC power or network activity is lost. The stand-alone computing device provides a self-contained platform for readily determining the assets of an entity In one embodiment, a facility database and a locality tool can be used to provide a list of buildings, estimated number of employees, and contract resources within a given distance and direction from an event location, such as an emergency or other crisis situation location. Preferably, a zip code associated with the location of an incident or event is determined. This zip code is entered into the locality tool which operates to determine the distance and direction of all other zip codes within a requested distance. This zip code, distance, and direction information can then be communicated to a facility database. Tables and queries of the facility database are configured to identify affected buildings, employees, contract resources, and other desired information based on the imported information.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 5 is a screen shot of an entered center point zip code into the locality tool;

DETAILED DESCRIPTION OF EMBODIMENTS

Embodiments of the invention provide methods and systems configured to expeditiously identify an entity's assets, such as human and physical resources, that are in some proximity of an incident or event, such as emergency or other crisis situation. As used herein, an "asset" refers to anything of value to an entity, such as buildings, equipment, employees, information, etc. Buildings can be identified within a stated distance and direction from the location of an event. Additionally, an estimated number of associated employees and contract resources can be determined. A stand-alone computing device can be used to derive the information if AC power or network activity is lost. The stand-alone computing device provides a self-contained platform for readily determining assets of an entity A number of acronyms are used throughout the description, such as:

| | |
|---|---|
| BC | Business Coordinators |
| BEM | Building Emergency Manager |
| TG | Technology Group |
| CLLI | Common Language Location Identification |
| CRES | Corporate Real Estate Services |
| GLC | Geographic Location Code |
| HR | Human Resources |
| HRC | Human Resources Code |
| RC | Responsibility Code |
| TU | Tracking Unit |

In the following detailed description, references are made to the accompanying drawings that form a part hereof, and in which are shown by way of illustrations specific embodiments or examples. These embodiments may be combined, other embodiments may be utilized, and changes may be made without departing from the spirit or scope of the present invention. The following detailed description is therefore not to be taken in a limiting sense and the scope of the present invention is defined by the appended claims and equivalents.

Exemplary Operating Environment

Figure 1:
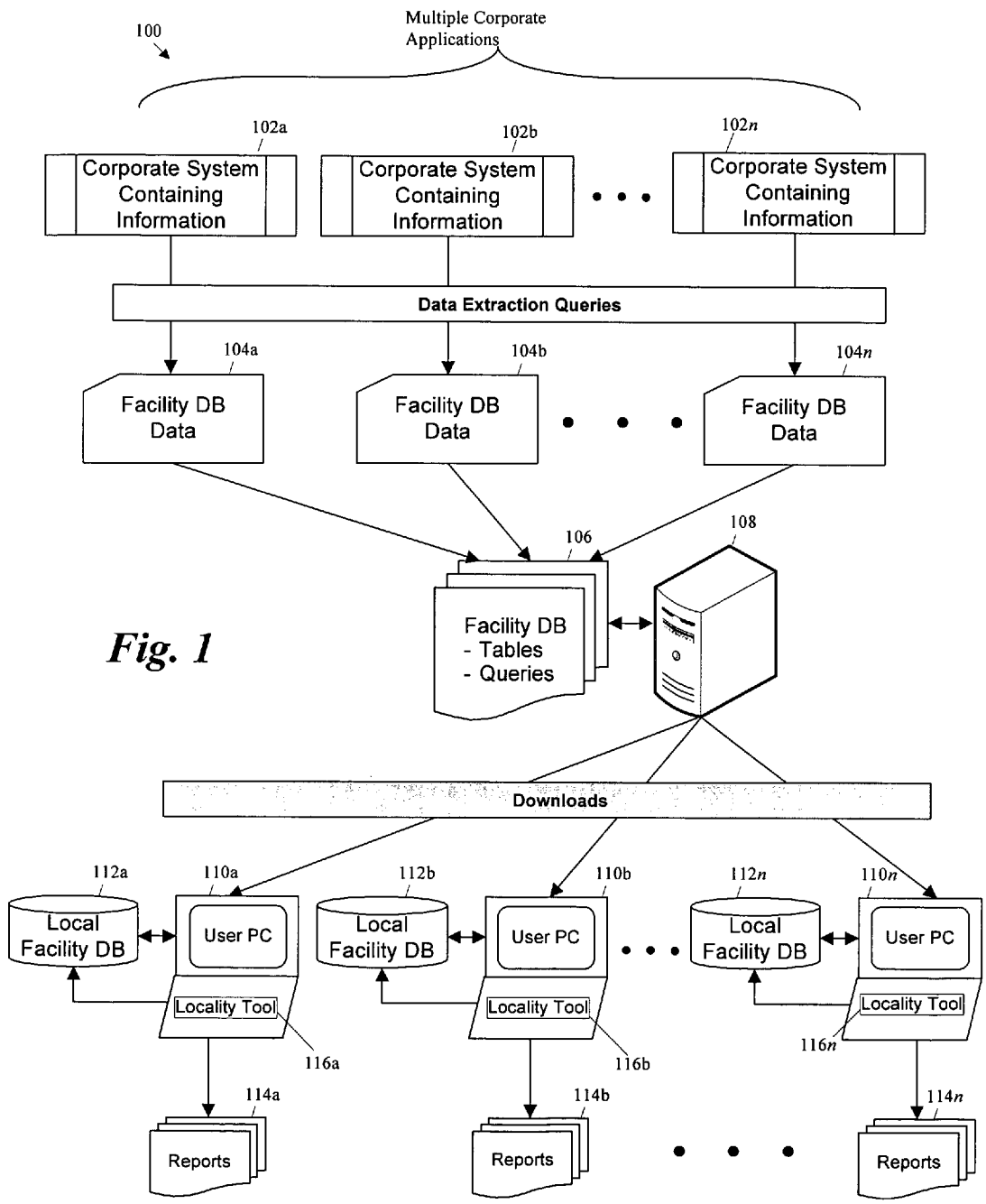
FIG. 1 illustrates an exemplary operating environment.

Referring now to the drawings, in which like numerals represent like elements through the several figures, aspects of the present invention and the exemplary operating environment will be described. FIG. 1 and the following discussion are intended to provide a brief, general description of a suitable operational environment in which the invention may be implemented.

FIG. 1 depicts an exemplary operating environment 100 for implementing an embodiment of the invention. The exemplary operating environment 100 of FIG. 1 is associated with an entity, such as a corporation, government infrastructure, military complex, etc. It will be appreciated that the embodiments of the invention described herein can be used in association with a number of different types of organizational and other asset configurations. As shown in FIG. 1, the operating environment 100 includes a number of corporate systems 102a-102n (where n is an integer). According to an embodiment, the corporate systems 102a-102n each include information associated with the entity. It will be appreciated that a single corporate system could contain all relevant information as well.

As an example, corporate system 102a can include location and other identification information associated with various buildings and other structures of the entity. The information, contained in a real estate database for example, can include particular building addresses, zip codes, building types (data center, central office, headquarters, etc.), etc. which can be extracted from the corporate system 102a. The extraction method may include specific scripts tailored to extract particular information.

Corporate system 102b can include contact and other identifying information associated with the employees of the corporation, for example. The employee information can include employee addresses and other contact information, which can be extracted from the corporate system 102b. The contact and other identifying information associated with the employees may be contained in a human resource (HR) database, for example. Corporate system 102n can include contract and other identifying information associated with the contract employees of the corporation. The contract information, contained in a contract database for example, can include third party contract resource and location information, etc., which can be extracted from the corporate system 102n.

With continuing reference to FIG. 1, data 104a-104n can be extracted from the corporate systems 102a-102n. The data 104a-104n can be extracted on a periodic or event driven basis. The data and other information can be in the form of tables, databases, and other formats. For example, data 102a can be building information extracted from corporate system 102a, data 102b can be building employee information extracted from corporate system 102b, and data 102n can be contract information extracted from corporate system 102n. This information is preferably stored in a facility database 106 on a central server 108. As described below, the content of the facility database 106 may be updated daily, weekly, monthly, etc., with the latest data stored in various locations or stores (data repositories). Regular e-mails may be sent to remind users of times to update the facility database 106. The data can be extracted from one or more locations and/or systems, using database queries, for example. The data can then be imported and saved to the facility database 106.

Other corporate systems can include other information, such as property, financial, administrative, etc. and any other information associated with the entity which can be extracted and saved on server 108. The information can be stored in and accessed from databases or other storage applications on a different server or other computing device(s). As used herein, "computing device" is meant to confer the broadest meaning to comprise desktop computers, servers, laptops, handheld computing devices, or other communicating devices, etc. It will be appreciated that the corporate systems 102a-102n can comprise a single server or individual servers for maintaining the respective data. The corporate systems 102a-102n also provide one or more channels for accessing information across a network or other communication infrastructure. The server 108 and corporate systems 102a-102n are preferably in communication via a local, wide, or other communication network topology, which can be wireless, wireline, or a combination of each.

FIG. 1 also depicts a number of user computing devices 110a-110n. The user computing devices 110a-110n may comprise desktop computers, but are preferably mobile computing devices, such as laptops, handheld computing devices, etc. A wireless telephone is another exemplary mobile computing device. Mobile computing device includes a computing device that can be readily transported from point to point. In a preferred embodiment, each user computing device includes at least 6 megabytes of free hard drive space, DOS 5.0 or higher, at least 512 k of random access memory (RAM), a database application (such as Microsoft ACCESS 2000, for example) and file encryption capability for the target directory associated with the facility database and other applications.

The user computing devices 110a-110n are preferably in communication with the server 108 via a local, wide, or other communication network topology, which can be wireless, wireline, or a combination of each. Preferably, the facility database 106 is periodically downloaded and saved to one or more of the computing devices 110a-110n. The facility database 106 can also be downloaded on an event driven basis. The facility database 106 is also saved on one or more of the user computing devices 110a-110n. FIG. 1 depicts local facility databases 112a-112n stored on the computing devices 110a-110n.

As described below, if an event occurs, such as an emergency, and disrupts a power grid, users of the computing devices 110a-110n will be able to use the local facility databases 112a-112n since the computing devices 110a-110n can continue to operate using battery power. Also, reports 114a-114n can be generated using information from the local facility databases 112a-112n and locality tools 116a-116n one of which preferably resides on each computing device 110a-110n. An exemplary locality tool 116 is the ZIP*Select tool made by Melissa Data Corporation of Rancho Santa Margarita, Calif. It will be appreciated that a locality tool and facility database could be remotely accessed if a communication network is available.

As one example, reports 114a-114n can be generated to provide information associated with affected assets, such as affected buildings, affected employees, affected employee homes and so forth. As described below, the locality tools 116a-116n preferably are configured to determine all zip codes within a requested radius of a given zip code. Outputs from the locality tools 116a-116n are assimilated with the local facility databases 112a-112n. Database applications, such as Microsoft ACCESS, can be used in conjunction with the foregoing for creating queries for extracting the data and information to tables of the facility database 106 and local facility databases 112a-112n.

As described above, the facility database 106 can be updated on a periodic basis. The user preferably migrates custom queries from the previous month to the current month's facility database 106. If the same target directory is always used for monthly downloads, the following steps need only be completed once. First, the user creates a new directory on the particular computing device for storing the file associated with the facility database 106. Next, the user right selects the folder, selects properties, selects advanced, encrypts contents to secure data, and selects "ok".

Table 1 below includes a number of preferred steps used in the initial installation and for the monthly updates to download the current facility database 106 to primary and backup computing devices, such as computing devices 110a-110n. The updates should occur as soon as possible after receiving a notification, such as an email notification.

TABLE 1

| | Action Taken | By Whom |
|---|---|---|
| 1 | Map to facility database 106 central server 108<br>Double click on My Computer<br>Select Tools from the Standard Toolbar<br>Select Map Network Drive from the drop-down box<br>Enter the address of the central server 108 in the Folder field<br>Confirm Reconnect at logon box is not checked<br>Click on the link for Connect using different user name<br>Enter the User name and Password for the central server 108<br>Click OK<br>Click Finish<br>Content of mapped drive will be presented | Primary crisis team rep<br>Backup crisis team rep |
| 2 | Copy the facility database 106 from the central server 108 to the encrypted directory on the target user computing device<br>From the list of the mapped drive content, open DR_Files folder<br>Open Database folder<br>Right click on the most current facility database 106 (naming convention = ECC_mmmdd_yy.mdb)<br>Select Copy from drop-down box<br>Select local drive and encrypted target directory<br>Select Edit from the Standard Toolbar<br>Select Paste from the Standard Toolbar<br>Reply Yes to the browser message: "Do you want to move or copy files from this zone?" | Primary crisis team rep<br>Backup crisis team rep |
| 3 | Disconnect from mapped server<br>Select the drive mapped to the central server 108<br>Select Tools from the Standard Toolbar<br>Select Disconnect Network Drive from the drop-down box | Primary crisis team rep<br>Backup crisis team rep |
| 4 | Logon to current month's facility database 106 on user computing device<br>1) Select current month's facility database 106 on the local drive<br>2) Enter the database password | Primary crisis team rep<br>Backup crisis team rep |
| 5 | If custom queries have been written, export the queries from last month's facility database 106 to the current month's facility database 106 | Primary crisis team rep<br>Backup crisis team rep |
| 6 | Delete previous month's facility database 106 | Primary crisis team rep<br>Backup crisis team rep |
| 7 | Ensure facility database 106 is encrypted<br>Right click on current month's facility database 106 file<br>Click on Properties<br>Click on Advanced . . .<br>Verify "Encrypt contents to secure data" is checked | Primary crisis team rep<br>Backup crisis team rep |
| 8 | Open the facility database 106 and sanity check tables and queries<br>Double click on ECC_mmmdd_yy.mdb file<br>Where:<br>ECC_ is the standard prefix<br>mmm is the alpha month that the database was created<br>dd_ is the numeric day of the month that the database was created<br>yy is the numeric year that the database was created<br>.mdb is the standard file extension for Microsoft ACCESS | |

The steps taken to initially install and update the locality tools 116a-116n are shown in Table 2 below. The locality tools are preferably updated quarterly to primary and backup computing device locations, automatically or by the primary and backup crisis representatives, as soon as possible after receiving a notification.

application and that the invention is not intended to be limited by the examples described herein.

Table 3 below lists the facility database table names and the associated description of each table. In the tables below, blank entries refer to data items that are obvious from the Field Name or data items not used by the facility database.

TABLE 2

| | Action Taken | By Whom |
|---|---|---|
| 1 | Create a directory on the target computing device where the locality tool is to be installed To reuse current installation directory, simply select the current installation directory | Primary crisis team rep Backup crisis team rep |
| 2 | Map to central server 108 Double click on My Computer Select Tools from the Standard Toolbar Select Map Network Drive from the drop-down box Enter the address of the central server 108 in the Folder field Make sure the Reconnect at logon box is not checked Click on the link for Connect using different user name Enter the User name and Password for the central server Click OK Click Finish Content of mapped drive will be presented | Primary crisis team rep Backup crisis team rep |
| 3 | Select the locality tool on the central server 108, for installation on the target computing device Open DR_Files folder Open Database folder Open ZIP_Select folder | Primary crisis team rep Backup crisis team rep |
| 4 | Execute (double-click on) Setup.exe to install the software. The InstallShield wizard presents several windows, whose replies are handled are follows: Welcome - click on Next License Agreement - click on Yes Choose Destination Location Click on Browse Select drive Select target directory for the software install (Note: Do NOT install in an encrypted folder) Click Next Select Features Make sure √ appears before ZIP*Select Click Next Setup Status - bar graph reflects performance of required operations InstallShield Wizard Complete Click Finish | Primary crisis team rep Backup crisis team rep |
| 5 | Launch and perfume sanity of the locality tool Double click on ZS.EXE Verify the updated date at the bottom right corner of the screen is correct. | Primary crisis team rep Backup crisis team rep |

The facility database 106 and local facility database(s) 112a-112n preferably include a number of tables. These tables are periodically refreshed, and provide the source for reporting produced by the queries described below. The Tables listed below are exemplary and it will be appreciated that other Tables can be built according to the particular

TABLE 3

| Table Name | Description |
|---|---|
| BC_Coordinators | Business Continuity Coordinators |
| Building_Emergency_Mgrs | Building Emergency Managers |

TABLE 3-continued

| Table Name | Description |
| --- | --- |
| Central_Offices | Central Offices |
| Company_Codes | Company Codes found in the Employee Master File maintained on a designated server, for example |
| Contract_Resources | Contract Resources |
| Dept_Heads | Department heads, and above, for all companies other than Communication Systems (CS) |
| DL_EMP_MAIL | Employee Email Address List used by public relations (PR) |
| Employees | Employees |
| GLC | Geographic Location Codes (GLC) |
| GLC_Type | Type of GLCs |
| Military | Military Bases |
| ZIPs_Affected | Holds the zip code(s) in the affected area. Information generated by a locality tool is preferably loaded into this table before standard queries are run. |

Table 4 below lists information associated with the Business Continuity Coordinators across an enterprise. Individuals in this table are preferably duplicated in the Employees table.

TABLE 4

| No. | Field Name | Field Content |
| --- | --- | --- |
| 1 | UID | Universal identification code |
| 2 | HRC9 | 1$^{st}$ 9 characters of HRC |
| 3 | Org | Organization that BC Coordinator is responsible for |
| 4 | Officer | Officer for the organization |
| 5 | Name | Level number and name (last name, first name) of BC Coordinator |
| 6 | Title | Individual's formal title |
| 7 | Bus Phone | Business telephone number |
| 8 | Home Phone | Home telephone number |
| 9 | Mobile Phone | Cell phone number |
| 10 | Ipager | Ipager address |
| 11 | Email | Work email address |

Table 5 below lists information associated with Building Emergency Managers (BEMs) across the enterprise. CRES preferably maintains the BEM master list and individuals in this table are duplicated in the Employees table

TABLE 5

| No. | Field Name | Field Content |
| --- | --- | --- |
| 1 | GLC | Geographic Location Code |
| 2 | Property Name | |
| 3 | Prop Type | Property type abbreviation |
| 4 | Bldg Cat | Building category |
| 5 | Address | Property Street Address |
| 6 | City | Property City |
| 7 | State | Property State |
| 8 | Zip | Property Zip, 5 digits |
| 9 | EOD | First name last name |
| 10 | BEM Name | No standard format |
| 11 | Mailing Address | BEM's mailing address |
| 12 | Field12 | BEM's mailing city |
| 13 | Field13 | BEM's mailing zip; 5 digits |
| 14 | Office Phone | BEM's other telephone number |
| 15 | Emergency Phone | BEM's emergency telephone number |
| 16 | Pager | Numeric pager phone number & pin or ipager address |

Table 6 below lists information associated with Central Offices across the enterprise. CRES preferably maintains the Central Office list.

TABLE 6

| No. | Field Name | Field Content |
| --- | --- | --- |
| 1 | Wire Center Name | |
| 2 | Category | |
| 3 | GLC | |
| 4 | Address | |
| 5 | City | |
| 6 | State | |
| 7 | Zip | 5 digits |
| 8 | Rank | Current ranking within category |
| 9 | Rank-99 | 1999 ranking within category |
| 10 | Wire Ctr CLLI | |
| 11 | # Of | |
| 12 | Host | |
| 13 | FG D Access | |
| 14 | Lata | |

Table 7 below lists Company Codes used in the Employee Master File. The Employee Master File is a file which includes information associated with the company employees. The data in Table 7 is preferably updated as organizational changes occur.

TABLE 7

| No. | Field Name | Field Content |
| --- | --- | --- |
| 1 | Company Code | Two character code |
| 2 | Company Name | Full company name |

Table 8 below lists information associated with all contract resources across the enterprise. An exemplary source of table data is the company's contract Meta Directory.

TABLE 8

| No. | Field Name | Field Content |
| --- | --- | --- |
| 1 | UID | Universal identification code |
| 2 | First Name | |
| 3 | Last Name | |
| 4 | Smtp_Addr | Work email address |
| 5 | Telephone Number | Work telephone number |
| 6 | Street | Work street address |
| 7 | City | Work city |
| 8 | State | Work state |
| 9 | Zip code | Work zip code; 5 digits |
| 10 | Sponsoring Company | |
| 11 | Company Code | |
| 12 | Department Name | |
| 13 | Title | |
| 14 | GLC | |
| 15 | RC/TU | |
| 16 | Sponsor UID | |
| 17 | Pager Company | |
| 18 | Ipager Address | |
| 19 | Pager Number | |
| 20 | Pager PIN | |
| 21 | Pager Type | |
| 22 | Fax Number | |
| 23 | Vendor Name | |
| 24 | Subcontracting | |
| 25 | Misc | |

Table 9 below lists information associated with department heads for all companies. Individuals are preferably duplicated in the Employees table, with the exception of officers.

TABLE 9

| No. | Field Name | Field Content |
| --- | --- | --- |
| 1 | Dept Head Name | Last name, first name middle initial |
| 2 | HRC Code | 20 character Human Resources Code |
| 3 | Department Full Name | |
| 4 | HRC5 | 1st 5 characters of the HRC |
| 5 | HRC8 | 1st 8 characters of the HRC |
| 6 | HRC9 | 1st 9 characters of the HRC |

Table 10 below lists information associated with Employee email address lists created for PR. Table is preferably created as needed by PR. Table 10 can be imported into PR bulk email utility, when bulk email distributions are necessary.

TABLE 10

| No. | Field Name | Field Content |
| --- | --- | --- |
| 1 | Smtp_Addr | |
| 2 | Record id | Starts at 1 and increments to last entry |

Table 11 below lists information associated with Employees with an active or on leave status. The data is preferably loaded from the company's Employee Master File.

TABLE 11

| No. | Field Name | Field Content |
| --- | --- | --- |
| 1 | Universal id | |
| 2 | CUID | |
| 3 | Name | Last name, first name |
| 4 | Title | |
| 5 | Jg Wagescale | Job grade wagescale |
| 6 | Rank Order Number | |
| 7 | Bus Adr Street | |
| 8 | Bus Adr City | |
| 9 | Bus Adr State | |
| 10 | Bus Adr Zip Code | |
| 11 | Bus Phone | |
| 12 | Home Phone | |
| 13 | Company Code | |
| 14 | HRC | 20 character Human Resource Code |
| 15 | HRC5 | 1st 5 characters of HRC |
| 16 | HRC8 | 1st 8 characters of HRC |
| 17 | HRC9 | 1st 9 characters of HRC |
| 18 | Home Adr Zip | |
| 19 | Mgt Nmgt Ind | M = Management |
|  |  | N = Non-management |
| 20 | Status Code | A = Active |
|  |  | L = Leave |
| 21 | Resp Code | Responsibility code |
| 22 | RC3 | 1st 3 characters of HRC |
| 23 | GLC | Geographic Location Code |

TABLE 11-continued

| No. | Field Name | Field Content |
| --- | --- | --- |
| 24 | Smtp_Addr | Work email address |
| 25 | Officer Org | Officer organization |
| 26 | FDC | |
| 27 | JTC | |
| 28 | Supervisor Ind | Y = Individual is a supervisor |

Table 12 below lists information associated with the geographic location codes (GLC) used in the Employee Master File. It is not unusual that not all buildings have GLCs.

TABLE 12

| No. | Field Name | Field Content |
| --- | --- | --- |
| 1 | GLC | 5 digits |
| 2 | Desc | Description |
| 3 | Status | |
| 4 | Unit | |
| 5 | PR Type | Property Type |
| 6 | Address | Property Address |
| 7 | City | Property City |
| 8 | County | Property County |
| 9 | State | Property St |
| 10 | Zip | Property Zip |
| 11 | O/L | |
| 12 | GR SF | |
| 13 | Shop | |
| 14 | OC | |
| 15 | CUID | |
| 16 | FM | Facility manager's name |
| 17 | Phone | Facility manager's office phone number |
| 18 | Pager | Facility manager's pager |
| 19 | CLLI | |
| 20 | LON | Longitude |
| 21 | LAT | Latitude |

Table 13 below lists information associated with the description and category associated with the GLC property type code. The data in Table 13 is preferably refreshed on an as needed basis.

TABLE 13

| No. | Field Name | Field Content |
| --- | --- | --- |
| 1 | PR Type | Property type |
| 2 | Description | |
| 3 | Category | Building category |

Table 14 below lists information associated with military base locations and their contact information. The data in Table 14 is preferably refreshed on an as needed basis.

TABLE 14

| No. | Field Name | Field Content |
|---|---|---|
| 1 | Service | Branch of service |
| 2 | State | |
| 3 | Zip | |
| 4 | Name | |
| 5 | Commercial | |
| 6 | DSN | |
| 7 | Web Page | |

Table 15 below lists information associated with zip code(s) within an affected area. Table 15 is preferably created prior to running any of the standard queries, and is created by first determining a center point zip code of an event and then using a locality tool 116a-116n to obtain a list of affected zip codes that are within a certain mile radius of the center point zip code. The data can then be loaded for all affected zip codes into a table.

TABLE 15

| No. | Field Name | Field Content |
|---|---|---|
| 1 | Zip | 5-digit zip code |
| 2 | City | |
| 3 | State | |
| 4 | Field4 | Not used |
| 5 | County | |

TABLE 15-continued

| No. | Field Name | Field Content |
|---|---|---|
| 6 | Field6 | Type of zip:<br>S = Standard<br>P = PO Boxes only<br>U = Unique zips assigned to a company<br>M = Military |
| 7 | Res | |
| 8 | Bus | Number of Businesses |
| 9 | PO | |
| 10 | Dist | Distance from center point zip code |
| 11 | Degrees | |
| 12 | Direction | Direction from center point zip code |

The facility database 106 and local facility database(s) 112a-112n preferably include a number of standard queries, listed below:

Affected_Central_Offices
Affected_GLCs
Affected_Contract_Resources
Affected_Employees
Affected_Employees_by_AVP_&above
Affected_Employees_by_Officer
Affected_Employees_by_SrDirector_&above
Affected_Employees_Homes The queries utilize the Tables listed above in returning information to a user. When requested, these queries may be executed on server 108 and/or on user PCs 110. If additional queries are required, the primary and/or backup resources for the crisis team will be responsible for creating and maintaining those queries.

The Affected_Central_Offices query operates to identify central offices located in zip codes that are within a given radius of an incident location. The process involves matching zip codes related to the emergency event to zip codes in the GLC table, and reports on the GLCs that are central offices. When running this query, Table 15 above is preferably loaded with those zip codes that a locality tool 116a-116n identifies as being within x miles of the emergency event center point zip code. An exemplary output from the Affected_Central_Offices query is shown below in Table 16.

TABLE 16

| Dist | Dir. | GLC | PR TYPE | Address | City | St | Zip | Cat. | Rank |
|---|---|---|---|---|---|---|---|---|---|
| 1 | S | 00001 | CO | 2745 BROADWAY AVE | LAS VEGAS | NV | 09273 | A | 89 |
| 2 | N | 00002 | CO | 545 MOCKINGBIRD LANE | HOUSTON | TX | 37298 | C | 10 |
| 3 | E | 00003 | CO | 2608 SCENIC HIGHWAY | BLUE WATER | KY | 33522 | E | 5 |
| 4 | W | 00004 | CO | 2005 BROWN STREET | CHARLOTTE | NC | 38751 | G | 47 |
| 5 | NW | 00005 | CO | 777 DENT AVENUE | BENTON | MO | 55903 | B | 23 |

As shown in Table 16 above, the distance and direction from the affected ZIP code is listed. The address of the central office is included along with the category and rank. The category refers to a grouping by importance and rank refers to its importance within its assigned category grouping.

The Affected_GLCs query operates to identify all buildings located in zip codes that are within a given radius of an incident location. The process involves matching zip codes related to the emergency event to zip codes in the GLC table, and provides reports on all GLCs. When running this query, Table 15 above is preferably loaded with the zip codes identified by the locality tool 116a-116n as being within x miles of the emergency event center point zip code. An exemplary output from the Affected_GLCs query is shown below in Table 17.

TABLE 17

| Dist | Dir. | GLC | Desc. | Address | City | County | State | Zip |
|---|---|---|---|---|---|---|---|---|
| 6 | S | 00006 | MAIN OFFICE | 87 NORA WAY | WEST MONROE | METARIE | LA | 20007 |
| 7 | S | 00007 | CLASS B OFFICE SPACE | 2176 PENELOPE ST | WEST MONROE | METARIE | LA | 20007 |
| 8 | S | 00008 | CLASS C OTHER SPACE | 7 SHORE LANE B-4 | WEST MONROE | METARIE | LA | 20007 |
| 9 | S | 00009 | CABINET | 985 BABCOCK WAY | WEST MONROE | METARIE | LA | 20007 |
| 10 | S | 00010 | ENVIRONMENT CABINET | 2223 OLD BILL COOKE ROAD | WEST MONROE | METARIE | LA | 20007 |
| 11 | S | 00011 | CONTROLLED ENVIRONMENT VAULT | 125 GLAD MORNING CIRCLE | WEST MONROE | METARIE | LA | 20007 |
| 12 | S | 00012 | EQUIPMENT STRUCTURE | 888 NICKLE WAY | WEST MONROE | METARIE | LA | 20007 |
| 13 | NE | 00013 | MAIN OFFICE | 1111 ENGLISH AVE | WEST MONROE | METARIE | LA | 20007 |
| 14 | NE | 00014 | CLASS D OFFICE SPACE | 7054 WESTMINSTER PLACE | WEST MONROE | METARIE | LA | 20007 |
| 15 | NW | 00015 | CENTRAL OFFICE | 5309 BOOSTER RD | WEST MONROE | METARIE | LA | 20007 |

As shown in Table 17 above, the distance and direction from the affected ZIP code is listed. The identities and addresses of affected buildings are also included.

The Affected_Contract_Resources query operates to identify all buildings with contract resources that are located in zip codes within a given radius of an incident location. The query also provides an estimated number of affected contract resources. The process involves matching zip codes related to the emergency event to zip codes in the Contract_Resources table, and reports on those buildings. When running this query, Table 15 above is preferably loaded with the zip codes identified by the locality tool 116a-116n as being within x miles of the emergency event center point zip code. An exemplary output from the Affected_Contract_Resources query is shown below in Table 18.

As shown in Table 18 above, the distances and directions from the affected zip code are listed. The identities and addresses of affected buildings are also included.

The Affected_Employees query operates to identify all buildings with employees that are located in zip codes within a given radius of an incident location. An estimated number of affected employees is also provided. Preferably, the HR crisis team, using an HR system and other information, can determine actual totals and a list of employee names. The process involves matching zip codes related to the emergency event to zip codes in the Employees table (Table 11), and reporting on the associated buildings. When running this query, Table 15 above is preferably loaded with the zip codes identified by the locality tool 116a-116n as being within x miles of the emer-

TABLE 18

| Dist | Dir. | GLC | Desc. | Street | City | County | ST | Zip | # Contrs. |
|---|---|---|---|---|---|---|---|---|---|
| 16 | S | 00016 | | 696 PAXTON RD | AKRON | Winston | OH | 20038 | 7 |
| 17 | S | 00017 | CLASS F OFFICE SPACE | 227 ROMAINE WAY | AKRON | Winston | OH | 20038 | 101 |
| 18 | S | 00018 | CLASS F OFFICE SPACE | 333 THINKIT ST | AKRON | Winston | OH | 20038 | 901 |
| 19 | S | 00019 | CLASS B OFFICE SPACE | 1159 APRIL COURT | AKRON | Winston | OH | 20038 | 15 |
| 20 | NE | 00020 | | 2021 GOODARD ST | AKRON | Winston | OH | 35216 | 22 |
| 21 | NW | 00021 | CLASS G OFFICE SPACE | 8111 SATURDAY LANE | BARTER | Shelby | TN | 36903 | 122 |
| 22 | NW | 00022 | | 909 CAPTAIN'S ALLEY | BARTER | Shelby | TN | 36903 | 11 |
| 23 | NW | 00023 | | 0011A VEGAN ST | BARTER | Shelby | TN | 36903 | 3 |
| 24 | SE | 00024 | | 4444 ESTES WAY | AKRON | Winston | OH | 20038 | 50 |
| 25 | SE | 00025 | | 2 KRISTI LANE | AKRON | Winston | OH | 20038 | 1 |
| 26 | SE | 00025 | MAIN | 9506 KIT CT | AKRON | Winston | OH | 20038 | 10 | gency event center point zip code. An exemplary output from the Affected_Employees query is shown below in Table 19.

TABLE 19

| Dist | Dir. | GLC | Desc. | Bus Adr Street | City | County | ST | Zip | # Emps |
|---|---|---|---|---|---|---|---|---|---|
| 27 | N | 00026 | CENTRAL OFFICE | 2 CASON WAY | WEST MONROE | NEWTON | LA | 20007 | 2 |
| 28 | N | 00027 | CENTRAL OFFICE | 3305 WILLET ST | WEST MONROE | NEWTON | LA | 20007 | 267 |
| 29 | N | 00028 | CENTRAL OFFICE | 885 KNIT ST | WEST MONROE | NEWTON | LA | 20007 | 3 |
| 30 | N | 00029 | CLASS B OFFICE SPACE | 8970 JUNE RD | WEST MONROE | NEWTON | LA | 20007 | 4 |
| 31 | N | 00030 | CLASS A OFFICE SPACE | 5060 AMY AVE | WEST MONROE | NEWTON | LA | 20007 | 4322 |
| 32 | N | 00031 | CLASS F OFFICE SPACE | 8710 YOUTH WAY | WEST MONROE | NEWTON | LA | 20007 | 50 |
| 33 | N | 00032 | CLASS P OFFICE SPACE | 1219 THURSDAY RD | WEST MONROE | NEWTON | LA | 20007 | 67 |
| 34 | SW | 00033 | CLASS P OFFICE | 0309C CARROT COURT | WEST MONROE | NEWTON | 20007 | 35216 | 2 |
| 35 | SW | 00034 | CLASS A OFFICE SPACE | 245 CONNELL'S PASS | WEST MONROE | NEWTON | LA | 20007 | 8 |
| 36 | SW | 00035 | CENTERAL OFFICE | 5002 MARKET ST | NEWTON | NEWTON | LA | 20007 | 44 |
| 37 | SE | 00036 | CLASS P OFFICE SPACE | 8700 MOZART LANE | LAS VEGAS | WAGER | NV | 09273 | 284 |
| 38 | SE | 00037 | CLASS O OFFICE SPACE | 2121 LOOSER LANE | LAS VEGAS | WAGER | NV | 09273 | 83 |
| 39 | SE | 00038 | MAIN OFFICE | 90256 MOONER | LAS VEGAS | WAGER | NV | 09273 | 4 |

A number of additional queries operate to provide information on employees in buildings in the affected area. For example, the Affected_Employees_by_AVP_&above, Affected_Employees_by_Officer, and Affected_Employees_by_SrDirector_&above queries operate to identify all buildings, with employees, located within zip codes that are within a given radius of an incident location, and provide estimated total number of employee by AVP, Officer, or Senior Director. Preferably, the HR crisis team can determine actual totals and provide a list of employee names for further review. The process involves matching zip codes related to the emergency event to zip codes in the Employees table, and issuing reports on those buildings. When running this query, Table 15 above is preferably loaded with the zip codes identified by the locality tool 116a-116n as being within x miles of the emergency event center point zip code. An exemplary output from the queries is shown below in Table 20.

TABLE 20

| Dist | Dir. | GLC | Desc. | Bus Adr Street | City | County | St | Dept Head | # Emps |
|---|---|---|---|---|---|---|---|---|---|
| 40 | S | 00039 | MAIN OFFICE | 505D CRANE ST | AKRON | WINSTON | OH | Murray, William | 10 |
| 41 | S | 00040 | MAIN OFFICE | HIGHWAY 95 EAST | AKRON | WINSTON | OH | Murray, William | 42 |
| 42 | S | 00041 | SERVICE OFFICE | 87310 BARGAIN WAY | AKRON | WINSTON | OH | Murray, William | 12 |
| 43 | S | 00042 | CLASS B OFFICE SPACE | 777 CAN KNOT DR | AKRON | WINSTON | OH | Murray, William | 55 |
| 44 | S | 00043 | CLASS Q OFFICE SPACE | 216 BELLOWS WAY | AKRON | WINSTON | OH | Murray, William | 71 |
| 45 | S | 00044 | CLASS Z OFFICE SPACE | 999 CRUISE ST | AKRON | WINSTON | OH | Murray, William | 31 |

TABLE 20-continued

| Dist | Dir. | GLC | Desc. | Bus Adr Street | City | County | St | Dept Head | # Emps |
|---|---|---|---|---|---|---|---|---|---|
| 46 | S | 00045 | CLASS Z OFFICE SPACE | #6 NORDIC | AKRON | WINSTON | OH | Murray, William | 72 |
| 47 | S | 00046 | CLASS Z OFFICE SPACE | 8-097 KIM LANE | AKRON | WINSTON | OH | Murray, William | 116 |

The Affected_Employee_Homes query operates to identify the estimated number of employees with homes that are located in zip codes within a given radius of an incident location. The estimated number of employee homes is preferably reported by zip code. The process involves matching zip codes related to the emergency event to home address zip codes of employees. When running this query, Table 15 above is preferably loaded with the zip codes identified by the locality tool 116a-116n as being within x miles of the emergency event center point zip code. An exemplary output from the Affected_Employee-Homes query is shown below in Table 21.

TABLE 21

| Dist | Direction | City | County | Zip | # Employee Homes |
|---|---|---|---|---|---|
| 49 | S | BARTER | WINSTON | 20007 | 5 |
| 50 | NE | BARTER | WINSTON | 20008 | 70 |
| 51 | NE | BARTER | WINSTON | 20009 | 6 |
| 52 | S | BARTER | WINSTON | 20010 | 48 |
| 53 | NE | BARTER | WINSTON | 20013 | 94 |
| 54 | NW | BARTER | WINSTON | 20014 | 1221 |
| 55 | S | BARTER | WINSTON | 20053 | 71 |
| 56 | SE | BARTER | WINSTON | 20054 | 4 |
| 57 | NE | BARTER | WINSTON | 20055 | 9 |
| 58 | S | BARTER | WINSTON | 20056 | 33 |

Figure 2:
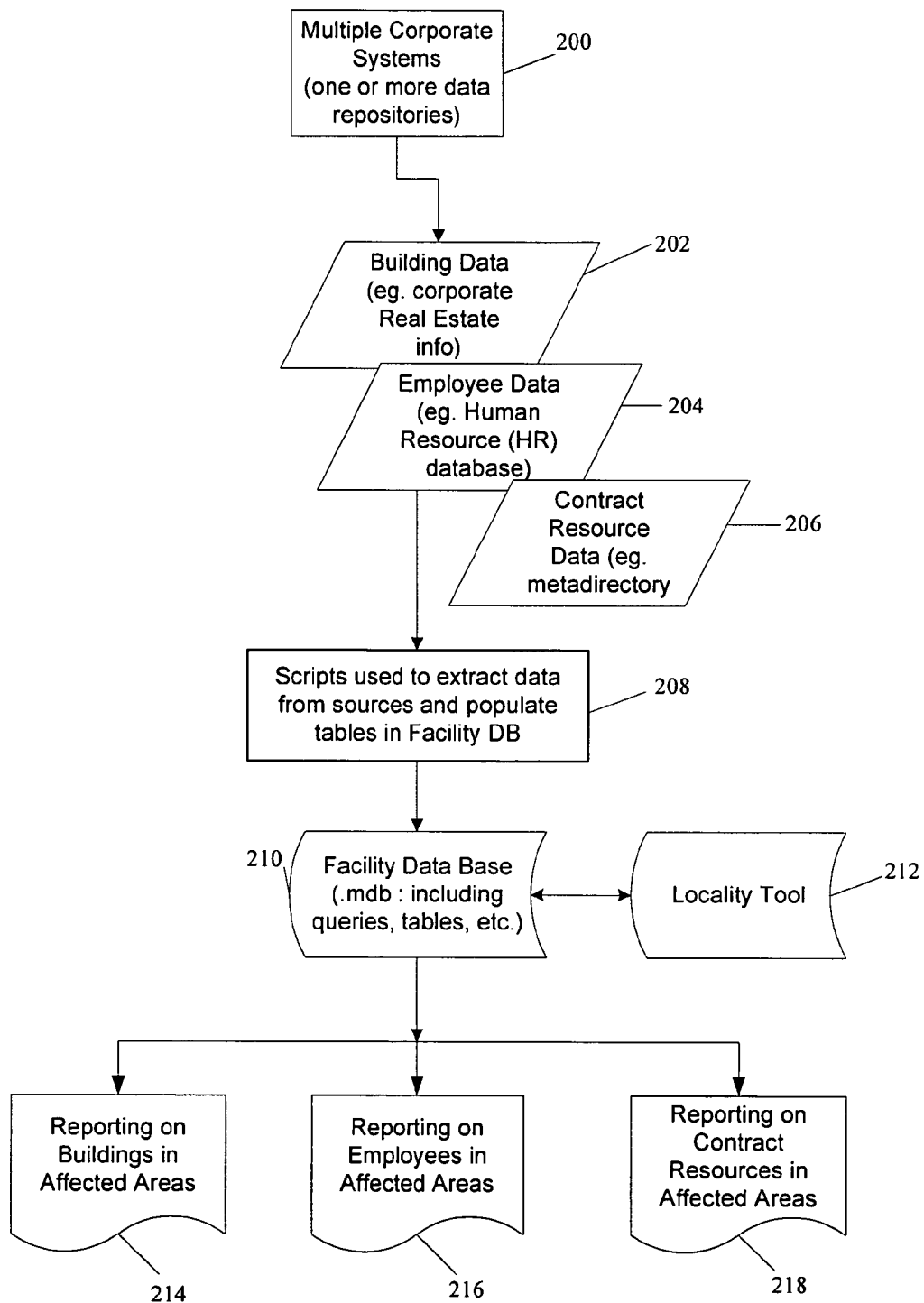
FIG. 2 is a functional block diagram depicting exemplary inputs and outputs of a facility database.

Referring now to FIG. 2, a functional block diagram provides an exemplary overview of inputs and outputs of the facility database 106. Block 200 represents multiple data repositories, such as those maintained by a corporation during the normal course of business. Blocks 202, 204, 206 represent data source subsets of the information represented by block 200. For example, block 202 represents building data related to the corporation, block 204 represents employee data related to the corporation, and block 206 represents contract resource data related to the corporation.

Block 208 represents an extraction process for extracting data from the data sources. The extraction process operates to populate tables in the facility database 106. Exemplary tables were described above. Block 210 represents the facility database 106 populated with data. The facility database 106 can include tables, queries, and other database application objects, as described above. Block 212 represents the locality tool, such as the locality tool 116 as described above. The locality tool 116 can be used in conjunction with the facility database 106 to generate outputs, such as the table outputs illustrated above. As shown in FIG. 2, block 214 represents the report 114 on buildings in affected areas. Block 216 represents the report 114 on employees in the affected areas. Block 218 represents the report 114 on contract resources in the affected areas.

Figure 3:
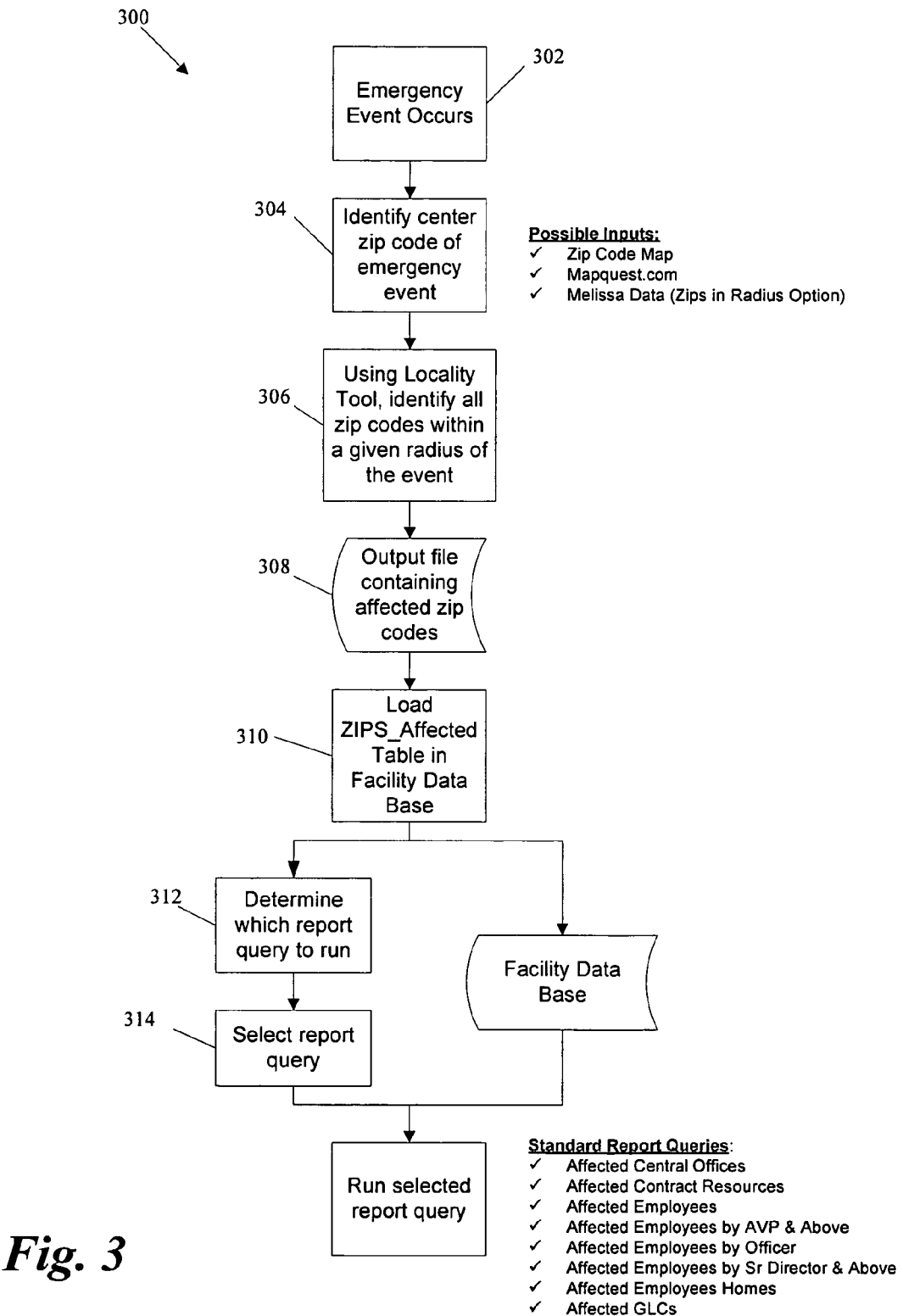
FIG. 3 is a flow diagram illustrating an exemplary method for using the facility database and locality tool to determine information associated with an entity.

Referring now to FIG. 3, a flow diagram illustrates an exemplary method 300 for using the facility database 106 and locality tool 116 to determine information associated with an entity. For this example, assume that an emergency event occurs at 302. Using one or more of the user computing devices 110a-110n, at 304, a user identifies a central zip code associated with the emergency event. It will be appreciated that numerous tools are available for identifying the center point zip code. The selection of a particular tool is often dependent on the information available about the event site.

For example, a zip code map can be used to identify a center point zip code. A typical zip code map contains all standard (i.e., non-PO Box, non-unique) zip codes. As another example, if internet connectivity is available, mapquest.com, yahoo.com, and other internet tools can provide the zip code based on an address, intersection, or business name, etc. Additionally, each locality tool preferably includes a "ZIPs In Radius" option which can provide a list of zip codes for a given county and/or town/city name. Since an event would not occur in a zip code that is used for P.O. Boxes only, these zip codes can be eliminated from the list of zip codes returned by the tool.

Once the central zip code associated with the event is determined, at 306, the locality tool 116 is used to identify all zip codes within a given radius of the event. At 308, the locality tool 116 provides an output, a table or tables for example, containing the affected zip codes. As described below, once the affected zip codes are determined, the facility database standard queries are run to identify assets such as buildings, employees, and contract resources within the area of the emergency event.

Figure 4:
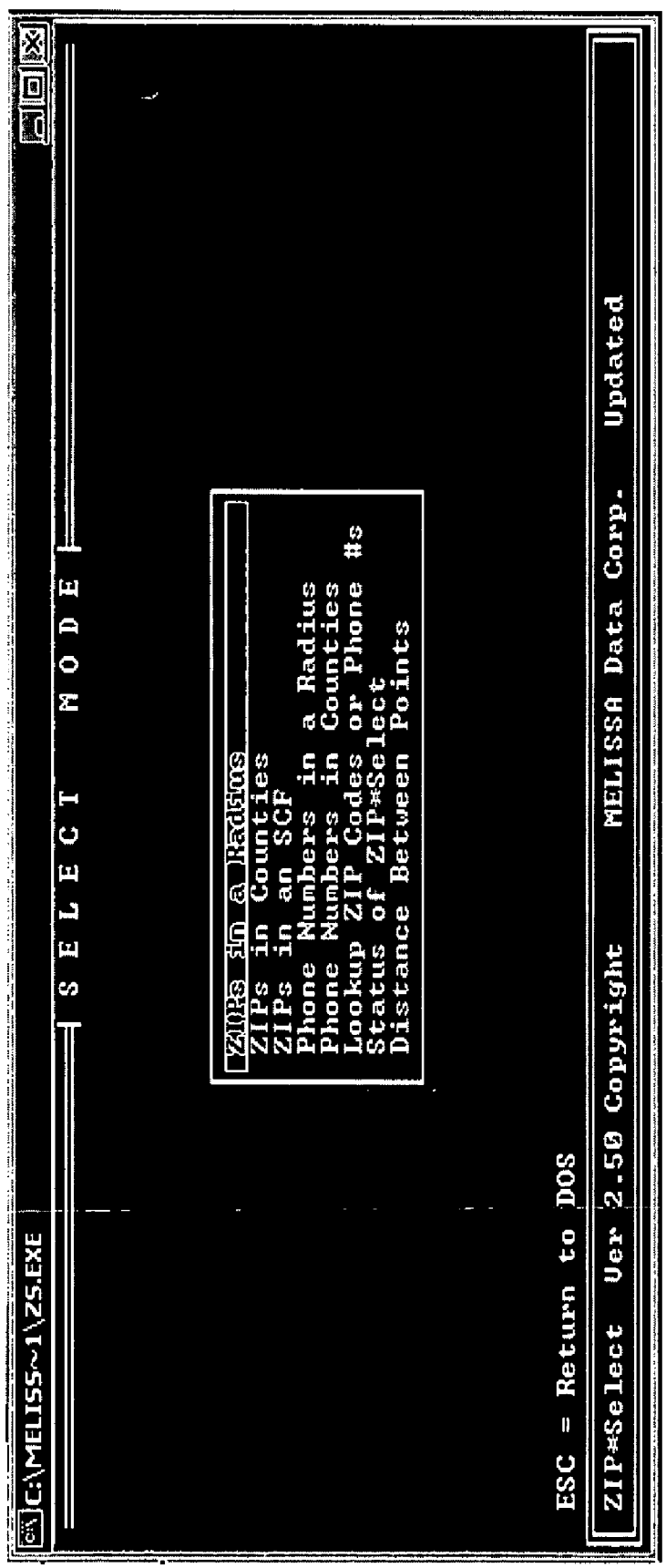
FIG. 4 is a screen shot of an opening window after starting a locality tool.
Figure 6:
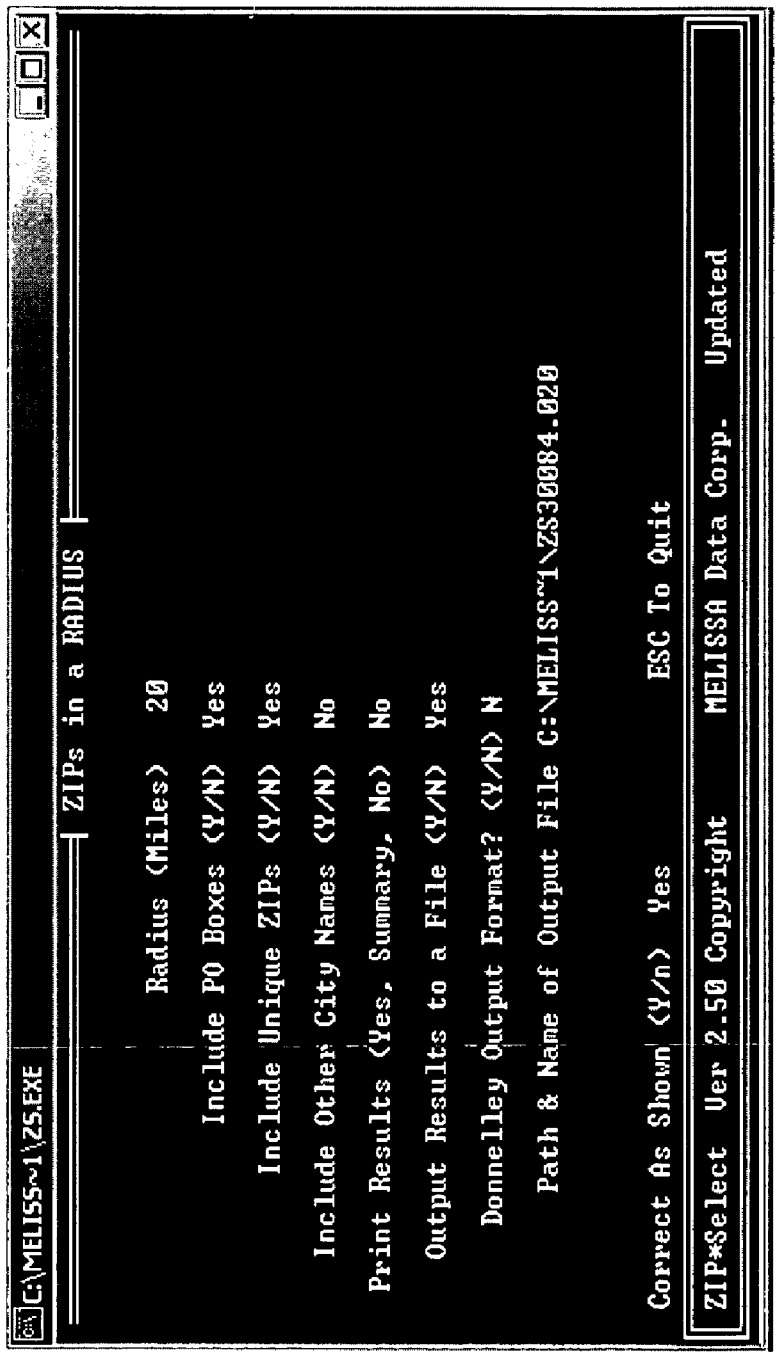
FIG. 6 is a screen shot illustrating various options available to the user of the locality tool.

An exemplary procedure for locating affected zip codes using a locality tool 116 is as follows. In the target directory, a user can double click on an associated executable, such as "ZS.EXE", to launch the locality tool 116. FIG. 4 is a screen shot of an opening window after starting the locality tool 116. At this point, the user highlights and selects "Zips in a Radius." For example, as shown in FIG. 5, a user has entered a center point zip code of 30084. FIG. 6 illustrates the various options available to the user at the Zips in Radius menu. To reduce the likelihood of requiring a second zip selection, a radius that is greater than the expected radius should be used. The query output is sorted by the building's distance from the incident, which readily enables identification of buildings closest to the incident.

Unique ZIPs, and P.O. Boxes should also be included since some buildings may be listed under P.O. Box zip code. The results are output to a file for loading into the ZIPs_Affected table of the facility database 106, as described above. The user can define a Path & Name of Output File, or accept the default setting. A preferred file name format is "ZSzzzzz.rrr", where "ZS"=Zip Select, "zzzzz"=center point zip code, "rrr"=radius.

Figure 7:
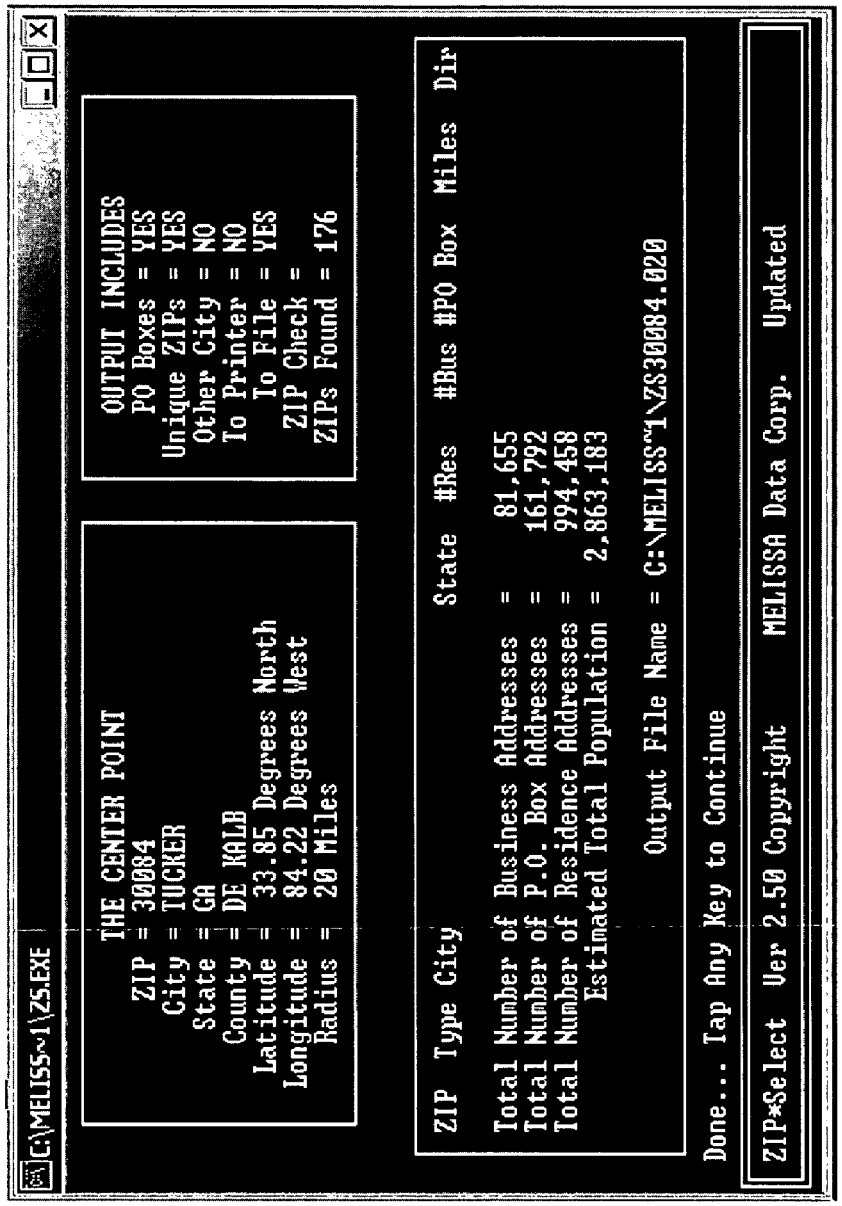
FIG. 7 is a screen shot illustrating a summary screen output from the locality tool.

FIG. 7 depicts a summary screen after the search is complete and the output file has been created in the target directory. As shown in FIG. 7, 176 zip codes were identified by the locality tool 116 based on the user provided radius. The output file in the target directory on the user computer is preferably converted to a text file so it can be imported into the ZIPs_Affected table in the facility database 106. The following naming convention is recommended to easily recognize file content. For example, change "ZS30084.020" to "ZS30084_020.txt". At 310, an interim facility database table is created to store the output from the locality tool 116. The interim table is copied into the ZIPs_Affected table which is used by the standard queries. This tends to ensure that the original output is not overwritten when queries are executed for multiple incident locations.

The interim table is of similar structure as is the ZIPs_Affected table:

From the Facility Database, highlight (single-click) ZIPs_Affected table
    Select Edit from the Standard Toolbar
    Select Copy from the dropdown box
    Select Edit from the Standard Toolbar
    Select Paste from the dropdown box
    In the Paste Table As dialog box
        Enter table name (for this example: ZIPs_30084_020)
            Naming convention ZIPs_zzzzz_rrr
            "ZIPs_" is the prefix
            "zzzzz_" is the center point zip code
            "rrr" is the radius
    Select Structure Only from the Paste Options
    Click OK The text file containing the output data can then be imported into the interim database table.

Figure 8:
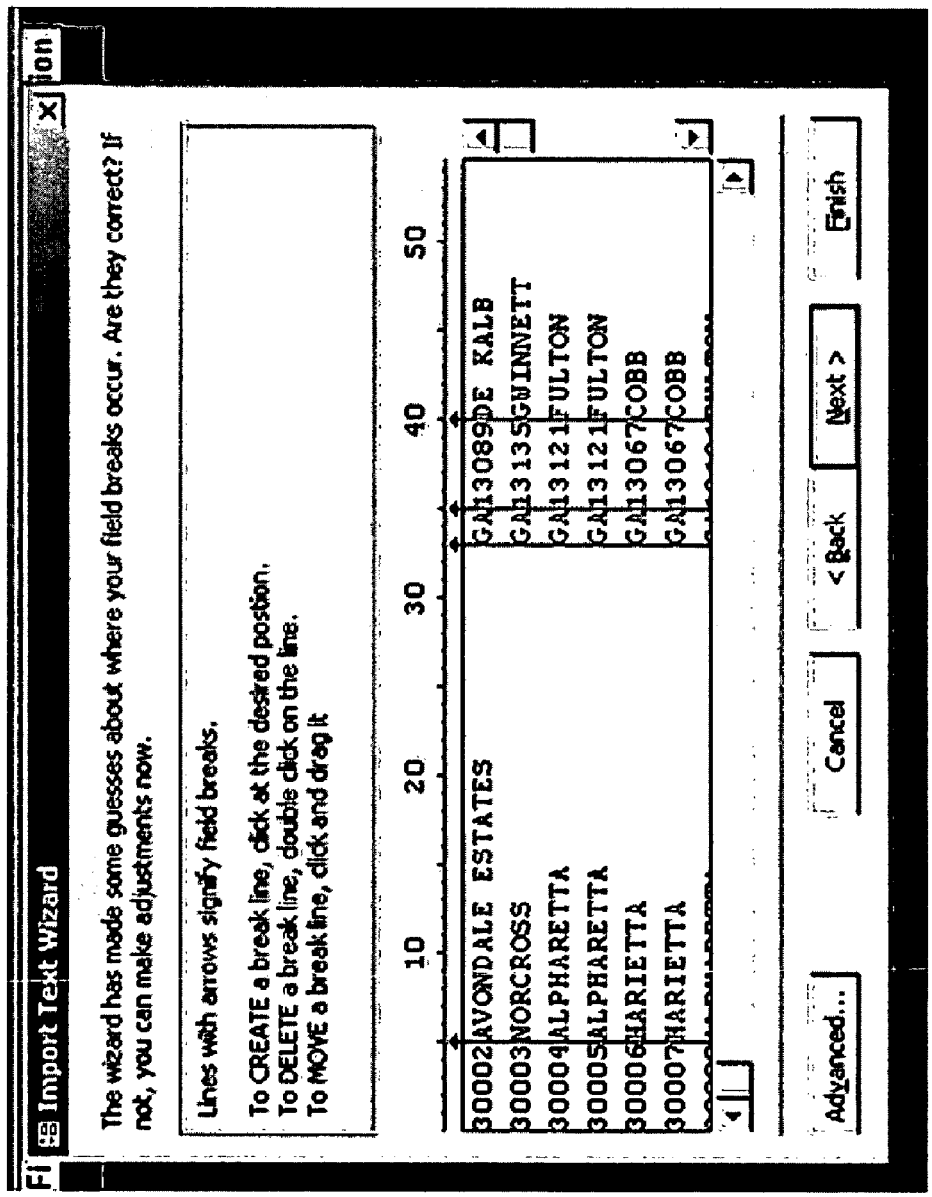
FIG. 8 is a screen shot illustrating an import text wizard for importing to an interim database table.

From the Facility Database, highlight (single-click) ZIPs_zzzzz_rrr table
    Select File from the Standard Toolbar
    Select Get External Data from the dropdown box
    Select Import (Get External Data option)
    Complete the following information in the Import dialogue box
        File of type: text file
        Look In: select Melissa Data target directory
        Select text file (ZS30084_020.txt)
        Click Import
    Import process is completed by the Import Text Wizard
        Select Fixed Width
        Click Next Create break lines by clicking at the desired positions (only need to set the first couple of field boundaries, Import Wizard will set the rest). FIG. 8 depicts the import wizard.

Click Next
    Question presented: Where would you like to store?
        Select In an Existing Table
        Enter Table Name (ZIPs_30084-020)
        Can select the table name from the list created when the down arrow is clicked
    Click Next
    Dialogue box displayed with the name of the table in Import to Table
    Click Finish
    Import Text Wizard will display message "Finished importing . . . "—click OK The data in the interim database table is then copied into the ZIPs_Affected table for the standard queries to be run.

Figure 9:
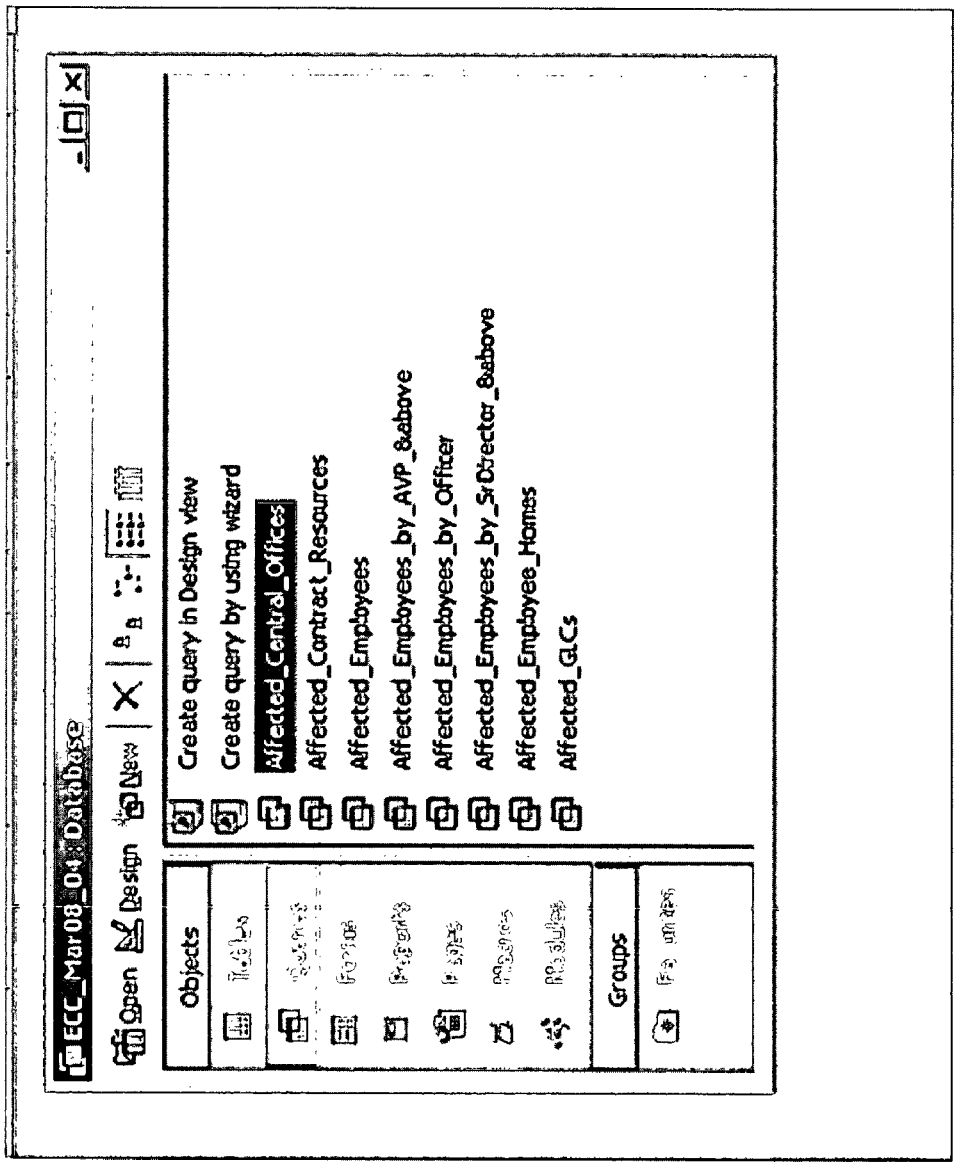
FIG. 9 is a screen shot illustrating queries that can be executed using the facility database.

Remove Existing data from ZIPs-Affected Table
    Open (double-click) ZIPs_Affected table in the Facility Database
    Select Edit from the Standard Toolbar
    Select Select All Records from the dropdown box
    Press Delete key
    The database application, Microsoft Access for this example, presents a delete confirmation message—click Yes Copy Desired Zip Codes into ZIPs_Affected Table
    Open ZIPs_zzzzz_rrr table
    Select Edit from the Standard Toolbar
    Select Select All Records from the dropdown box
    Select Copy from the dropdown box
    Close ZIPs_zzzzz_rrr table
    Message to save data on the clipboard—click Yes
    Select ZIPs_Affected table
    Select $1^{st}$ row in table by clicking on Triangle at left
    Select Edit from the Standard Toolbar
    Select Paste from the dropdown box
    Message to verify data should be pasted into the table—click Yes
    Last row will likely be blank. If so,
        Select the row and press Delete key
        Answer Yes to warning you are about to delete 1 record
    Close ZIPs_Affected table To ensure that the standard queries work properly, the output data from ZIP*Select is loaded into the ZIPs_Affected table (using the process described above). At 312, and as shown in FIG. 9, a user can select which query or queries, to run. At 314, the user selects the query name from the list of Queries in the facility database 106. The user can execute the query by double clicking on the query name. Table 22 below is a sample output after running a query using the facility database 106.

TABLE 22

| Dist | Dir. | GLC | PR Type | Address | City | St | Zip | Category | Rank |
|---|---|---|---|---|---|---|---|---|---|
| 59 | S | 00047 | CO | 333 WIDGET WAY | BLUE WATER | KY | 37298 | B | 14 |
| 60 | N | 00048 | CO | #4 AMBER LANE | BLUE WATER | KY | 37298 | D | 59 |
| 61 | SE | 00049 | CO | 56556 BRAY WAY | BLUE WATER | KY | 37298 | A | 43 |
| 62 | S | 00050 | CO | 310 MYSTERY LANE | BLUE WATER | KY | 37298 | B | 6 |
| 63 | W | 00051 | CO | 776 COURTIM COURT | BLUE WATER | KY | 37298 | C | 45 |
| 64 | NE | 00052 | CO | 979 LAKE LOREY LANE | BLUE WATER | KY | 37298 | B | 65 |
| 65 | N | 00053 | CO | 558 FORGE PATH RD | BLUE WATER | KY | 37298 | D | 2 |

Table 22 provides a distance and a direction, as well as an address of affected central offices based on the executed query. The category refers to a grouping by importance and rank refers to its importance within its assigned category grouping.

The most effective way to share query results is to export results to a spreadsheet application, such as an Excel spreadsheet, and email it to other users. Auto filters can be activated to allow users to focus on the information they deem most pertinent. The process for creating the spreadsheet is as follows:

Run the query
With the query results displayed on the screen:
Select Edit from the Standard Toolbar
Select Select All Records from the dropdown box
Select Edit from the Standard Toolbar
Select Copy from the dropdown box
Launch the spreadsheet application
When the spreadsheet application opens a new file, select the 1st cell in the 1st row
Select Edit from the Standard Toolbar
Select Paste from the dropdown box
Turn on Auto Filter by selecting Data, Filter, Auto Filter
Adjust the column width to accommodate data size
Close the spreadsheet and save it with an appropriate name.

It should be appreciated that various embodiments can be implemented as a sequence of acts and implemented using software and/or hardware resources. In one embodiment, one or more software applications can be utilized to obtain the information described above. That is, the procedure described above can be automated and executed from one or more computer systems to provide the various acts and procedures described above. Accordingly, logical operations may be implemented in software, firmware, special purpose digital logic, and any combination thereof. Moreover, the logical operations described herein can be rearranged to flow in many other implementations and combinations.

As used herein, program modules, software, or applications, generally include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer readable media as used herein includes both storage media and communication media.

Although various exemplary embodiments have been described, those of ordinary skill in the art will understand that many modifications can be made thereto. Accordingly, it is not intended that the scope of the invention in any way be limited by the above description and other embodiments of the invention will be apparent to those skilled in the art from consideration of the specification and practice of the invention disclosed herein.

We claim:

1. A computer-implemented method of determining an entity's assets associated with an event, the method comprising:

periodically querying a real estate database for facility information describing a building's address, a ZIP code associated with the building, and a type of the building;
periodically querying a corporate database for employee information describing an employee's address and contact information;
periodically querying a contractor database for contractor information describing a third party contractor's address and contact information;
storing the facility information, the employee information, and the contractor information in a facility database;
determining a zone improvement plan code by a processor that is associated with the event;
receiving a radius about the zone improvement plan code;
determining by the processor additional zone improvement plan codes within the radius about the zone improvement plan code;
querying the facility database for the zone improvement plan code and for the additional zone improvement plan codes;
retrieving, by the processor, a list of employee names associated with the zone improvement plan code and with the additional zone improvement plan codes; and
reporting the list of employee names as the entity's assets associated with the event.

2. The method of claim 1, further comprising reporting an address associated with each employee in the list of employee names.

3. The method of claim 1, further comprising retrieving a list of affected contractors associated with the zone improvement plan code and for the additional zone improvement plan codes.

4. The method of claim 1, further comprising querying facility information for the zone improvement plan code and for the additional zone improvement plan codes.

5. The method of claim 4, further comprising grouping the facility information by importance and rank.

6. The method of claim 1, further comprising reporting a list of employee homes associated with the zone improvement plan code and for the additional zone improvement plan codes.

7. The method of claim 1, further comprising estimating a number of employee homes affected by the event.

8. The method of claim 1, further comprising populating a table with the additional zone improvement plan codes within the radius about the zone improvement plan code.

9. The method of claim 8, further comprising converting the table to a text file.

10. The method of claim 1, further comprising estimating a number of employees affected by the event.

11. A computer-readable medium storing computer-executable instructions which when executed perform a method of determining an entity's assets associated with an event, the method comprising:

periodically querying a real estate database for facility information describing a building's address, a ZIP code associated with the building, and a type of the building;
periodically querying a corporate database for employee information describing an employee's address and contact information;
periodically querying a contractor database for contractor information describing a third party contractor's address and contact information;
storing the facility information, the employee information, and the contractor information in a facility database;
periodically downloading and saving the facility database to a mobile computing device;

receiving at the mobile computing device a zone improvement plan code associated with the event;

receiving at the mobile computing device a radius about the zone improvement plan code;

executing a software application at the mobile computing device that determines additional zone improvement plan codes within the radius about the zone improvement plan code;

querying the facility database stored in the mobile computing device for the zone improvement plan code and for the additional zone improvement plan codes;

retrieving a list of employee names associated with the zone improvement plan code and the additional zone improvement plan codes; and reporting the list of employee names as the entity's assets associated with the event.

12. The computer-readable medium of claim 11, further comprising instructions for reporting an address associated with each employee in the list of employee names.

13. The computer-readable medium of claim 12, further comprising instructions for retrieving a list of affected contractors associated with the zone improvement plan code and for the additional zone improvement plan codes.

14. The computer-readable medium of claim 11, further comprising instructions for querying facility information for the zone improvement plan code and for the additional zone improvement plan codes.

15. The computer-readable medium of claim 11, further comprising instructions for estimating a number of employees affected by the event.

16. The computer-readable medium of claim 11, further instructions for comprising reporting a list of employee homes associated with the zone improvement plan code and for the additional zone improvement plan codes.

17. A computing system configured to determine an entity's assets associated with an event, the computing system comprising:

a processor executing code stored in memory, the code causing the processor to:

periodically query a real estate database for facility information describing a building's address, a ZIP code associated with the building, and a type of the building;

periodically query a corporate database for employee information describing an employee's address and contact information;

periodically query a contractor database for contractor information describing a third party contractor's address and contact information;

store the facility information, the employee information, and the contractor information in a facility database;

receive a zone improvement plan code associated with the event;

receive a radius about the zone improvement plan code;

determine additional zone improvement plan codes within the radius about the zone improvement plan code;

query the facility database for the zone improvement plan code and for the additional zone improvement plan codes;

retrieve a list of employee names associated with the zone improvement plan code and the additional zone improvement plan codes; and report the list of employee names as the entity's assets associated with the event.

18. The computing system of claim 17, wherein the code further causes the processor to report an address associated with each employee in the list of employee names.

19. The computing of claim 17, wherein the code further causes the processor to retrieve a list of contractor names associated with the zone improvement plan code and for the additional zone improvement plan codes.

20. The computing of claim 19, wherein the code further causes the processor to query facility information for the zone improvement plan code and for the additional zone improvement plan codes.

* * * * *